Figure 3:
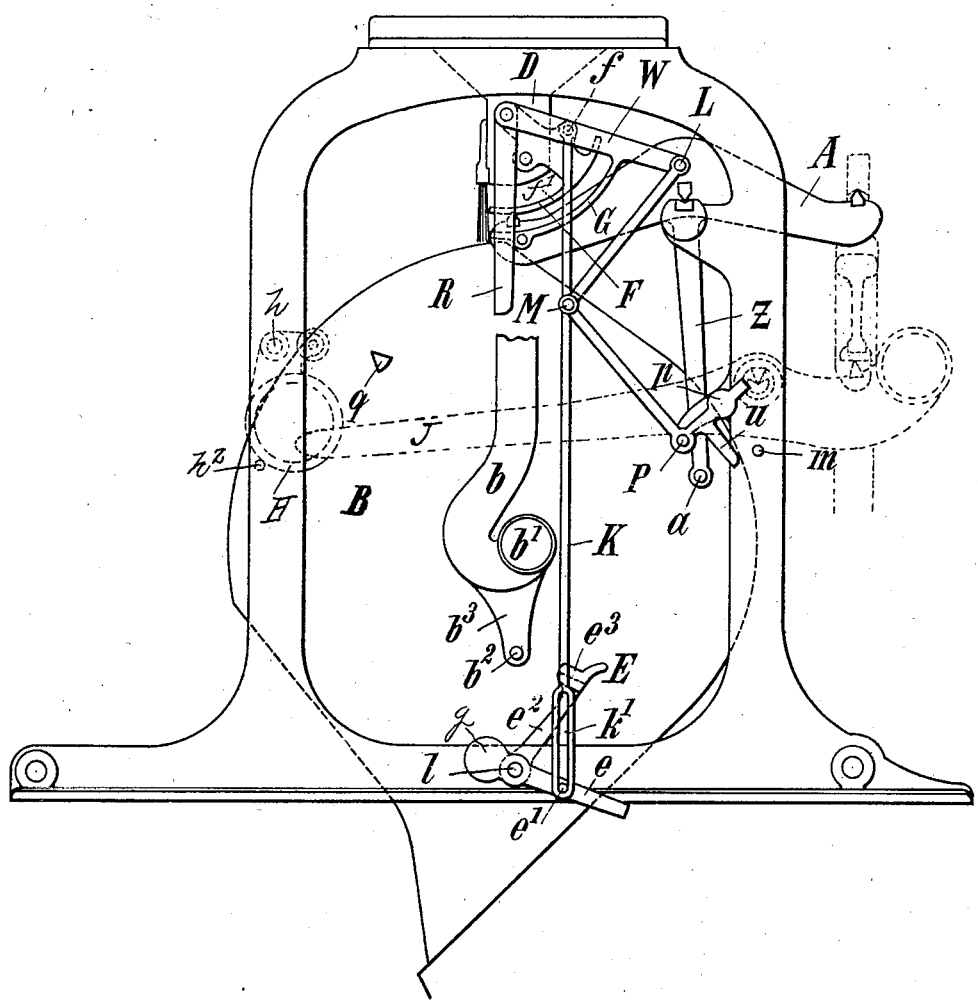

No. 652,642. Patented June 26, 1900.
M. E. REISERT.
AUTOMATIC WEIGHING APPARATUS.
(Application filed Feb. 1, 1899.)
(No Model.) 2 Sheets—Sheet 1.
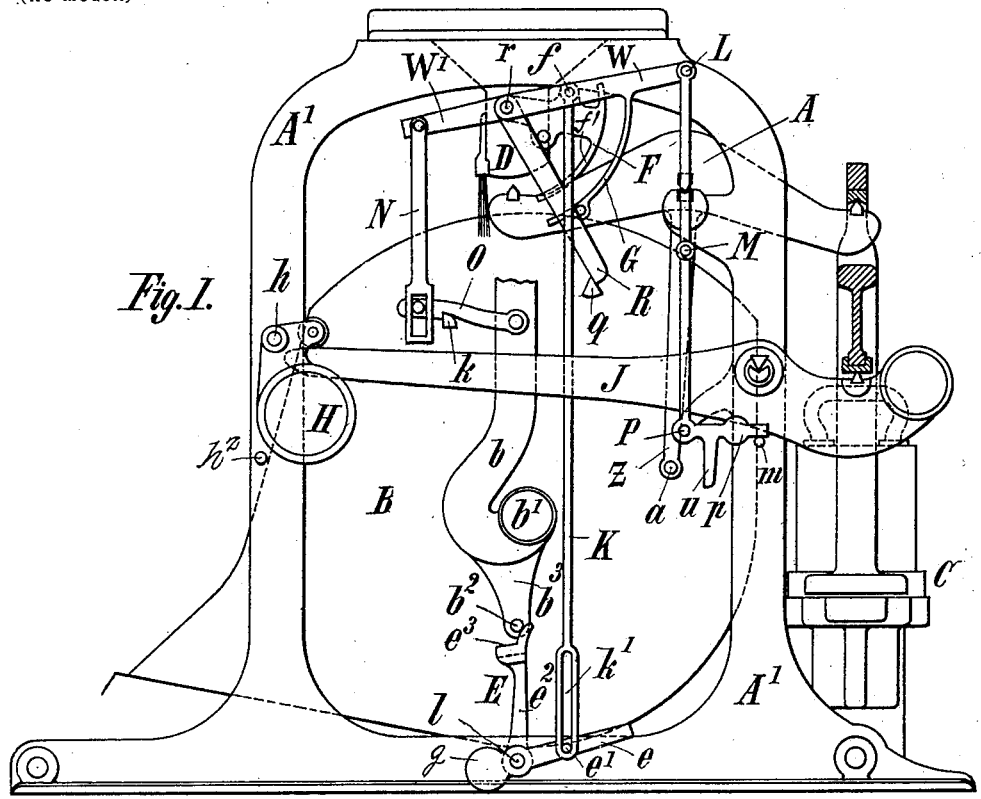
Fig. 1.
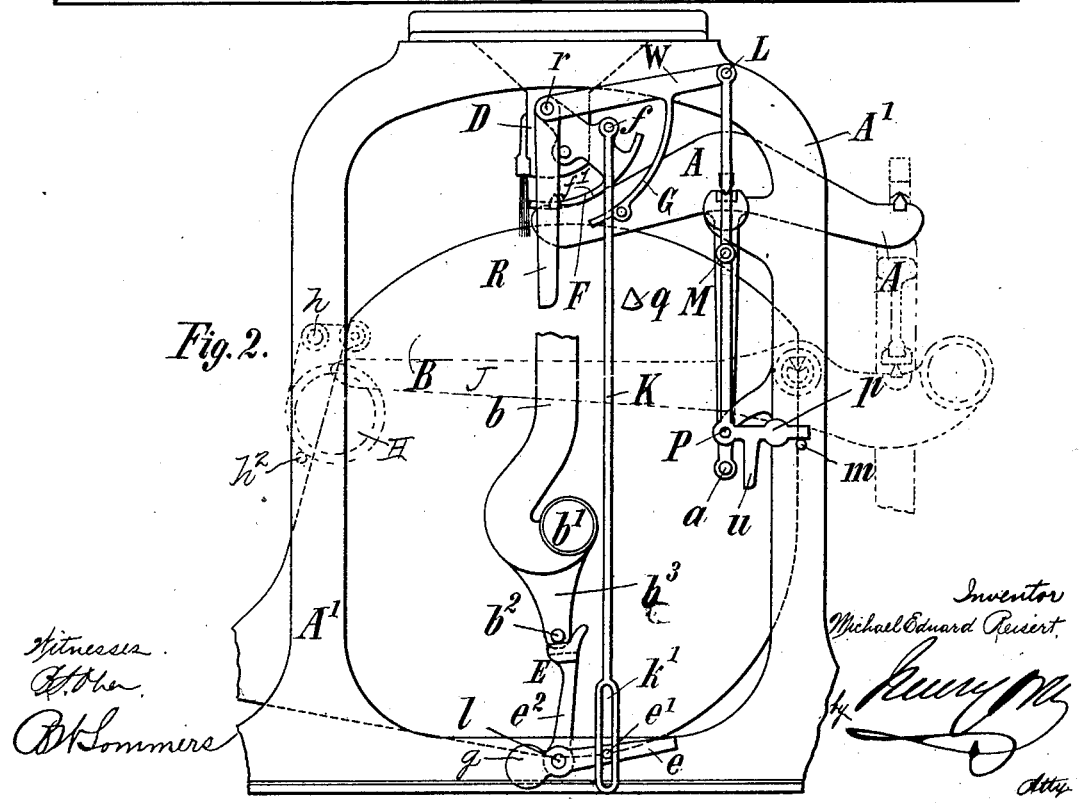
Fig. 2.
Witnesses
Inventor
Michael Edward Reisert
THE NORRIS PETERS CO., PHOTO-LITHO., WASHINGTON, D. C.

No. 652,642. Patented June 26, 1900.
M. E. REISERT.
AUTOMATIC WEIGHING APPARATUS.
(Application filed Feb. 1, 1899.)

(No Model.) 2 Sheets—Sheet 2.

UNITED STATES PATENT OFFICE.

MICHAEL EDUARD REISERT, OF HENNEF-ON-THE-SIEG, GERMANY, ASSIGNOR TO THE HENNEFER MASCHINEN-FABRIK C. REUTHER & REISERT, MIT BESCHRÄNKTER HAFTUNG, OF SAME PLACE.

AUTOMATIC WEIGHING APPARATUS.

SPECIFICATION forming part of Letters Patent No. 652,642, dated June 26, 1900.

Application filed February 1, 1899. Serial No. 704,124. (No model.)

*To all whom it may concern:*

Be it known that I, MICHAEL EDUARD REISERT, a subject of the German Emperor, and a resident of Hennef-on-the-Sieg, in the German Empire, have invented certain new and useful Improvements in Automatic Weighing Apparatus, of which the following is a specification.

The present invention relates to improvements in automatic weighing apparatus in which the material to be weighed passes from a hopper into a receptacle which when properly filled empties itself automatically in a well-known manner. In such weighing apparatus the material is allowed to pass into the said receptacle until the desired weight is obtained, and the supply is then cut off by a gate or gates beneath the supply-funnel.

The object of the improvements is to relieve the scale from the action of the *vis viva* of the material entering the receptacle in order to secure the greatest correctness in weighing and an exact working of the apparatus when the scale-beam equipoises.

With this end in view my invention consists of certain novel features of construction and combinations of parts, as will be hereinafter fully described with reference to the accompanying drawings, in which—

Figure 1 is a side elevation of the improved weighing apparatus, of which is shown only as much as is necessary for the clear understanding, the constituent parts being in the position they occupy when both the slotted flap and the cut-off gate are opened and the material is being fed into the receptacle. Fig. 2 is a similar view with the different parts in the position they occupy just before the cut-off gate is closed. Fig. 3 is a like view showing the essential parts just after the equilibrium is reached at the end of the weighing period, the receptacle being tilted for delivering its contents.

Similar letters refer to similar parts throughout the several views.

A is the scale-beam; B, the receptacle for receiving the material to be weighed; C, the weight-seat; D, the hopper; F, the slotted flap for reducing the supply of the material; G, the cut-off gate for entirely stopping the supply of material; $b$, the hanger in which the said receptacle is supported by means of trunnions $b'$, the hanger itself being suspended from the scale-beam A in well-known manner. For the sake of clearness, however, this attachment or suspension is not illustrated in the drawings, but the upper end of the hanger shown as broken away.

H is a weight pivoted to the frame A' at $h$ and acting upon a lever or auxiliary scale-beam J.

R is an arm actuated by a projection $q$ of the receptacle and adapted to open the flap F and gate G. The flap F is provided with slots $f'$, extending from the front edge thereof to the dotted line shown in the drawings, serves as a reducing-valve, and is well known in machines of this class and requires no further illustration, while the gate G or cut-off valve is for entirely stopping the supply of material to the hopper. The arm R, as well as the flap and gate, are pivoted on the shaft $r$. The cut-off gate G is connected with an arm W, and this latter with a toggle L M P, which is straightened by the rising gate G and held upright by means of a counterweight $p$, resting upon a stop $m$.

Z is an arm or hand attached to the scale-beam A and adapted to cause the toggle to bend toward the left as soon as a pin $a$ of the arm Z strikes against the arm $u$ of the said toggle.

O is a hook pivoted to the hanger $b$ and engaging a lug $k$ of the receptacle, thus arresting the latter in the upright position. The hook O is disengaged from the lug $k$ by means of a rail N, pivotally suspended from an arm W', rigidly connected with the gate G or the arm W, respectively. Also any other suitable catching and disengaging device may be used for the purpose of arresting the receptacle.

The above-described mechanisms and parts of the weighing apparatus are well known and constructed, arranged, and operating substantially as set forth, for instance, in the specification of the United States Patent No. 376,965, dated January 24, 1888, and in the specification of the United States Patent No. 637,896. In the latter specification there is also shown and described a means for relieving the scale from the action of the *vis viva* of the material entering the receptacle, which means consists of a stop device (revoluble hook) adapted to engage, after the release of the cut-off gate, with the hanger, and to interrupt thereby the oscillation of the scale, the said stop device being again disengaged from the hanger at the moment the said cut-off gate shuts up entirely the supply of material; but in this arrangement it may occur that the stop device will be already disengaged again still before the hanger has come in engagement with the stop device— that is to say, still before the scale has descended sufficiently and come at rest. This possibility will be obviated by the present invention, in that the release of the stop device is retarded by means of a body or the like, which at or after the closure of the cut-off gate moves itself automatically in consequence of its gravity and but effects the disengaging of the stop device by this movement, the arrangement and the direction of motion of this body being such that its movement or oscillation is a sufficiently-slow one.

In carrying this invention into practice I provide in automatic weighing apparatus of the class above referred to a suitable stop device, which preferably consists of a bent lever E, having its fulcrum on a pivot or projection $l$ of the frame. The arm $e$ of this lever E is connected with the flap F by means of a rod K, which is pivoted to the said flap at $f$ and has at its lower extremity a slot or eye $k'$, into which engages a pin $e'$ of the arm $e$. The other arm $e^2$ is provided with a shoulder $e^3$, against or upon which the hanger $b$ will strike with a pin $b^2$ or the like carried by an arm $b^3$ in order to bring the descending hanger or receptacle at rest, as this will be explained later on, the arrangement of the bent lever E being thus that its center of gravity is at the right-hand side of the pivot $l$ and is brought by applying a suitable counterweight $g$ to the bent lever E as close as possible to the said pivot, so that the bent lever E possesses only a small turning momentum. Supposing the working parts are in the position illustrated by Fig. 1, in this position the material enters through the hopper into the receptacle. After nearly sufficient material has entered into the receptacle to equipoise the balance the said receptacle descends until the weight H, pivoted to the frame A' at $h$ and resting with a friction-roller $h'$ on the front end of an auxiliary scale-beam J, strikes against a stop $h^2$ on said frame A', Fig. 2, the function and operation of which are fully described in my United States Patent No. 376,965. During this short downward motion the projection $q$ has released the lever R, thus allowing the latter, as well as the flap F and the rod K, to drop into the position shown by Fig. 2, in which the flap F bars the lower supply-opening of the hopper up to the slots in the said flap. As by the dropping of the rod K the bent lever E is not influenced, but is only freed and allowed to slowly turn about its pivot $l$ to the right, the descending receptacle is enabled to strike or set itself with the pin $b^2$ of its hanger $b$ $b^3$ upon the shoulder $e^3$ of the arm $e^2$ of the bent lever E still before this latter is turned entirely out off the path of the hanger $b$ or its pin $b^2$, respectively. By this striking upon the bent lever the balance or scale beam comes to rest, as will be clearly understood from Fig. 2. Through the flap F now enters only so much of the material into the receptacle B as is necessary to exactly equipoise the scale-beam and to cause its motion again, since the hanger $b$ is no longer barred by the bent lever E, which in the meantime has turned out off the path of the said hanger into or nearly into the position shown in Fig. 3. At this further oscillation of the scale-beam the pin $a$ of the arm Z pushes against the arm $u$, and thereby causes the toggle L M P to bend toward the left-hand side, whereby the cut-off gate G is closed and the catch device O $k$ disengaged in well-known manner, thus permitting the receptacle to tilt over and to pour out its contents. This position of parts is shown in Fig. 3. When the receptacle B after being emptied returns into its upright position, the flap F and gate G will be opened again by means of the projection $q$ and arm R in well-known manner. As the flap F is in connection with the bent lever E by the connecting-rod K, the latter will also be returned into its original position, Fig. 1, and held therein by the said rod K until this rod descends by the next closure of the flap F.

Instead of connecting the lever or stop-piece E with the flap F the former may also be connected with the receptacle by means of a lever or lever arrangement, so that the said stop-piece is commanded or operated by the motion of the receptacle itself, and therefore independent of the flap.

Having fully described my invention, I declare that what I claim, and desire to secure by Letters Patent, is—

1. In a weighing apparatus, the combination with the scale-pan, hopper and valve thereon, of a weighted abutment for the scale-pan arresting the motion of the pan due to the inertia of the incoming material, partially displaced and held so by the weight of the pan, dropped out of the way of the scale-pan when released, and mechanism for returning the abutment into operative position, substantially as set forth.

2. In a weighing apparatus, the combination with the scale-pan, hopper and a pair of valves thereon; of a weighted abutment for said scale-pan arresting its motion due to inertia of the incoming material, partially displaced by the weight of the pan and dropped out of the way of the pan when released, and a link connected to one of said valves for positioning the abutment after emptying the pan, substantially as set forth.

3. In a weighing apparatus, the combination with the scale-pan, its hangers, one of such provided with a lug, the scale-beam, feed-hopper and feed-controlling appliances; of a counterbalanced bell-crank lever, adapted to be engaged and partially displaced by the aforesaid lug when the scale-pan descends, under the inertia of the incoming material, to be held so while taking up the inertia, and moved out of the way of the lug when said scale-pan again ascends, for the purpose set forth.

4. In a weighing apparatus, the combination with the scale-pan, beam, hopper, supply-cut-off valves and a lug on an element moving with the scale-pan; of a counterbalanced bell-crank, a notch on one arm thereof normally resting against said lug, a curved face on said notch against which said lug slides to partially displace the bell-crank, and a link attached to the other arm of said crank to return it to normal position after having fallen out of the path of said lug, substantially as and for the purpose set forth.

MICHAEL EDUARD REISERT.

Witnesses:
WILLIAM H. MADDEN,
CHARLES E. BARNES.